United States Patent Office 2,884,434
Patented Apr. 28, 1959

2,884,434
HALOORGANO SILCARBANE SILOXANES

Donald D. Smith, Midland, Mich., assignor to Dow Corning Corporation, Midland, Mich., a corporation of Michigan No Drawing. Application March 7, 1957
Serial No. 644,445

6 Claims. (Cl. 260—448.2)

This invention relates to siloxanes derived from monovinyl silanes having a halogenated cyclobutyl group, a trifluoropropyl group, a trifluorotolyl group, or a hexafluoroisohexyl group on the silicon.

More specifically this invention relates to a compound of the formula $$\left[ \underset{XSi(CH_2)_2Si}{\overset{R_2 \quad R_2}{}} \right]_2 O$$

where R is selected from the group consisting of aryl, alkyl, and cycloalkyl hydrocarbon radicals and X is selected from the group consisting of $CF_3CH_2CH_2$—, $$\underset{CF_3CH_2CH_2CHCH_2-}{\overset{CF_3}{}}$$

a cyclobutyl group of the formula $C_4H_3F_3Cl$— and

R can be any saturated aliphatic hydrocarbon radical, e. g. methyl, 2-ethyl-hexyl and octadecyl, any saturated cycloaliphatic hydrocarbon radical, e. g. cyclopentyl and cyclohexyl, and any aryl hydrocarbon radical, e. g. phenyl, tolyl, xenyl and naphthyl. X can be $CF_3CH_2CH_2$—, $$\underset{CF_3CH_2CH_2CHCH_2-}{\overset{CF_3}{}}$$

ortho-, meta-, and para-trifluorotolyl radicals,

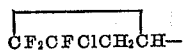

and

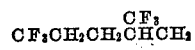

The chlorotrifluorocyclobutyl radicals are best attached to silicon as shown in the copending application of Arthur F. Gordon, Serial No. 494,287, filed March 14, 1955. The $CF_3CH_2CH_2$— and $$\underset{CF_3CH_2CH_2CHCH_2}{\overset{CF_3}{}}$$

radicals are best attached to silicon by reacting the corresponding olefins with the desired SiH compound at an elevated temperature.

The silylethylsiloxanes of this invention are preferably prepared by reacting silanes of the formula $$\underset{YSiX}{\overset{R_2}{}}$$

where X and R are as above defined and Y is a hydrolyzable group such as a halogen, e. g. chlorine, bromine, and iodine, or an alkoxy group, e. g. methoxy and butoxy, with vinyl Grignard to form a monovinyl silane. A preferred method for the preparation of vinyl Grignard reagents is disclosed by H. Normant, Compt. rend. 239, 1510, 1811; ibid., 240, 314, 440, 631. Subsequently the vinylsilane is reacted with a symmetrical tetraorgano disiloxane $$\underset{(i.e.\ HSiOSiH)}{\overset{R_2\ R_2}{}}$$

where the organic radicals are defined by R above. This reaction is best accomplished by cautiously heating the vinylsilane to 100° C. (or its boiling point if less than 100° C.) with a catalyst such as platinum on charcoal or chloroplatinic acid in dimethylcarbitol until the reaction becomes spontaneous and maintaining the reaction temperature between 150–175° C.

Another method of preparation is employing the above Grignard reaction to form a monovinyl silane $$\underset{(XSiCH=CH_2)}{\overset{R_2}{}}$$

which is reacted with a diorganomonohalosilane $$\underset{R_2SiH}{\overset{Y}{}}$$

to form the silylethylmonohalosilane $$\underset{(XSiCH_2CH_2SiY)}{\overset{R_2 \quad R_2}{}}$$

which can be hydrolyzed and condensed to form the silylethyldisiloxane $$\underset{(XSiCH_2CH_2Si)_2O}{\overset{R_2 \quad R_2}{}}$$

Alternatively, one may prepare a silane of the formula $$\underset{CH_2=CHSiY}{\overset{R_2}{}}$$

where R and Y are as above defined and subsequently react it with a silane of the formula $$\underset{XSiH}{\overset{R_2}{}}$$

where X and R are as above defined to produce $$\underset{XSiCH_2CH_2SiY}{\overset{R_2 \quad R_2}{}}$$

which can be hydrolyzed and condensed to the disiloxane. In this method the $$\underset{CH_2=CHSiY}{\overset{R_2}{}}$$

silanes may first be condensed to disiloxanes before reaction with the $$\underset{XSiH}{\overset{R_2}{}}$$

silane.

If desired, any of the above hydrolyses can be carried out in the presence of an inert solvent such as benzene, toluene, ether, and the like. In the silanes and dihydrodisiloxanes used as starting materials it is necessary that the non-reacting organic radicals be limited to R as above defined to prevent extraneous and deleterious side reactions.

This invention also relates to copolymers of from 0.1 to 80 mol percent of (1) the siloxanes of this invention and from 20 to 99.9 mol percent of (2) compositions of the unit formula $$Z_m SiO_{\frac{4-m}{2}}$$

where Z can be any monovalent hydrocarbon radical or any halogenated derivative thereof, and $m$ has an average value of from 0 to 3 inclusive. In said copolymers the total number of Z groups and (1) siloxane units per silicon atom of (2) is at least 1.

These copolymers can be prepared by any means of copolymerization such as cohydrolyzing a mixture of halo- or alkoxy-silanes of the formulae $$\underset{XSi(CH_2)_2SiY}{\overset{R_2 \quad R_2}{}}$$

and $Z_m SiY_{4-m}$ where X, R, Z, Y, and $m$ are as above defined. Another method of preparation of the copolymers of this invention is catalytic copolymerization of the siloxanes of this invention with siloxanes of the formula $$Z_m SiO_{\frac{4-m}{2}}$$

preferably in the presence of an acid catalyst.

Z can be alkyl, e. g. methyl, 2-ethyl-hexyl and octadecyl; cycloalkyl, e. g. cyclohexyl and cyclopentyl; halogenated alkyl, e. g. 2,3-dibromopropyl and 4-trifluoromethyldecyl; halogenated cycloalkyl, e. g. 2,4,6-triiodocyclohexyl; aryl, e. g. phenyl, xenyl and naphthyl; halogenated aryl, e. g. 2,4-dichlorophenyl, β-bromonaphthyl, and bromoxenyl; aralkyl, e. g. benzyl; halogenated aralkyl, e. g. α-chlorobenzyl and 2,4-dichlorobenzyl; alkaryl, e. g. tolyl; halogenated alkaryl, e. g. trifluorotolyl; alkenyl, e. g. vinyl, allyl and 5,6-octadecenyl; cycloalkenyl, e. g. 2,3-cyclopentenyl; halogenated alkenyl, e. g. 3-iodoallyl and symdibromovinyl; and halogenated cycloalkenyl, e. g. 4,5-dichloro-2,3-cyclohexenyl. Z can also be any of the groups defined by X.

The siloxanes of this invention are especially useful as lubricants and may also be used for coatings, elastomers and molding resins.

The following examples are illustrative only and should not be construed as limiting the invention which is properly set forth in the appended claims.

Example 1

(a)

$$\overset{\mid}{C}H_2CF_2-CFCl-\overset{\mid}{C}H-\overset{Me_2}{\underset{\mid}{Si}}Cl$$

was dissolved in an equal volume of tetrahydrofuran, and the solution was added slowly with stirring to a solution of vinyl Grignard in tetrahydrofuran in a ratio of one mol of silane per mol of Grignard reagent. During the reaction the reaction flask was cooled by an ice water bath. When the silane addition was complete, the reaction mixture was allowed to warm to room temperature. The contents of the reaction flask were poured into an ice water mixture, and hydrochloric acid was added to dissolve magnesium salts. The organic layer was separated, washed with water several times to remove most of the tetrahydrofuran, and dried with calcium hydride. The dried organic layer was distilled and a 72% yield of chlorotrifluorocyclobutylvinyldimethylsilane was obtained. This product had the following properties:

| B.P. (° C.) | $d_4^{25}$ | $n_D^{25}$ |
|---|---|---|
| 82/30 mm | 1.144 | 1.4220 |

(b) This silane was heated to 100° C. with 0.06% platinum on charcoal so that there was one gram of catalyst per mol of silane. Sym-tetramethyldisiloxane was added slowly so that the temperature of the spontaneous reaction was maintained in the range 150–175° C. until the addition was complete. The reaction mixture was cooled, diluted with ether and filtered. The ether was removed by distillation at atmospheric pressure. The residual fluid was heated to 150° C. at a pressure of approximately 1 mm. Hg to remove low molecular weight materials and was refiltered. The product was a fluid disiloxane of the formula $$\left[\overset{\mid}{C}FClCF_2CH_2\overset{\mid}{C}H\overset{Me_2}{\underset{\mid}{Si}}(CH_2)_2\overset{Me_2}{\underset{\mid}{Si}}\right]_2 O$$

(c) This polymer was tested for lubricity in a Shell 4-ball wear tester for two hours at 75° F. at 1200 r.p.m. with various loads. The results (scare diameter in millimeters) were as follows:

| Load kg | 4 | 10 | 40 |
|---|---|---|---|
| Scar | 0.31 | 0.32 | 0.72 |

Example 2

When 3,3,3-trifluoropropyldimethylmethoxysilane, p-α,α,α - trifluorotolyldimethylchlorosilane, and 5,5,5-trifluoro-2-trifluoromethylamyldimethylchlorosilane was substituted for the chlorosilane in Example 1(a), the corresponding vinylsilanes and silylethyldisiloxanes resulted:

$$CF_3CH_2CH_2\overset{Me_2}{\underset{\mid}{Si}}CH=CH_2, \quad CF_3\underset{}{\underset{}{\bigcirc}}\overset{Me_2}{\underset{\mid}{Si}}CH=CH_2$$

$$CF_3CH_2CH_2\overset{CF_3}{\underset{\mid}{C}}HCH_2\overset{Me_2}{\underset{\mid}{Si}}CH=CH_2$$

$$\left[CF_3CH_2CH_2\overset{Me_2}{\underset{\mid}{Si}}(CH_2)_2\overset{Me_2}{\underset{\mid}{Si}}\right]_2 O$$

$$\left[CF_3\underset{}{\underset{}{\bigcirc}}\overset{Me_2}{\underset{\mid}{Si}}(CH_2)_2\overset{Me_2}{\underset{\mid}{Si}}\right]_2 O$$

and $$\left[CF_3CH_2CH_2\overset{CF_3}{\underset{\mid}{C}}HCH_2\overset{Me_2}{\underset{\mid}{Si}}(CH_2)_2\overset{Me_2}{\underset{\mid}{Si}}\right]_2 O$$

The disiloxanes were suitable as lubricants.

Example 3

When monochlorodimethylsilane was substituted for the sym-tetramethyldisiloxane of Example 1(b) and the resulting product was hydrolyzed, a fluid disiloxane of the formula $$\left[CFClCF_2CH_2\overset{\mid}{C}H\overset{Me_2}{\underset{\mid}{Si}}(CH_2)_2\overset{Me_2}{\underset{\mid}{Si}}\right]_2 O$$

resulted.

Example 4

When 3,3,3 - trifluoropropylvinyldimethylsilane and phenyloctadecylmonochlorosilane are reacted in accordance with the method of Example 1 in a molar ratio of 1:1 and the reaction product is hydrolyzed and condensed with 2,4-dichlorophenylvinyldichlorosilane in a molar ratio of 2 mols of the reaction product to one mol of the dichlorosilane, a thermoplastic copolymer is formed consisting of $$\left[CF_3CH_2CH_2\overset{Me_2}{\underset{\mid}{Si}}(CH_2)_2\overset{Ph}{\underset{\mid}{Si}}O-\right]$$
$$\underset{C_{18}H_{37}}{}$$

and $$\left[\underset{\underset{CH=CH_2}{\overset{\mid}{Si-O-}}}{\overset{Cl}{\underset{}{\bigcirc}}-Cl}\right]$$

units.

Example 5

When p-α,α,α-trifluorotolyl-2-ethyl-hexylnaphthylvinylsilane and dixenylmonoethoxysilane are reacted in accordance with the method of Example 1 in a molar ratio of 1:1 and the reaction product is hydrolyzed and condensed with bis-3,3,3-trifluoropropyldiethoxysilane in a molar ratio of one mol of the reaction product to three mols of the diethoxysilane, the resulting thermoplastic copolymer consists of $$\left[CF_3\underset{}{\underset{}{\bigcirc}}\underset{\underset{Et}{\overset{\mid}{H_2C-CH-(CH_2)_3-Me}}}{\overset{\mid}{Si(CH_3)_2-SiO-}}\left[\underset{}{\underset{}{\bigcirc}}\underset{}{\underset{}{\bigcirc}}\right]_2\right]$$

and

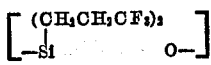

units.

Example 6

When 5,5,5 - trifluoro - 2 - trifluoromethylamylditolyl-vinylsilane and dicyclohexylmonochlorosilane are reacted in accordance with the method of Example 1 in a molar ratio of 1:1 and the reaction product is hydrolyzed and condensed with tolyl - 2,3 - cyclopentenyl-2-ethyl-hexyl-chorosilane in a molar ratio of 1:1, a fluid copolymer results which consists of

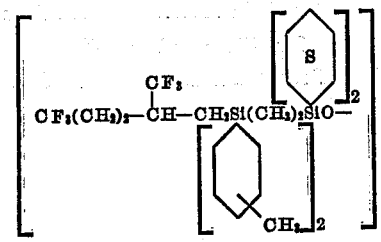

and

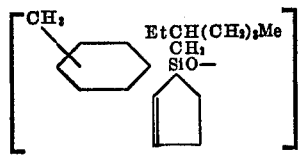

units.

Example 7

When 3,3,3 - trifluoropropylphenylbutylvinylsilane and methylnaphthylmonochlorosilane are reacted in accordance with the method of Example 1 in a molar ratio of 1:1 and the reaction product is hydrolyzed and condensed with silicon tetrachloride in a molar ratio of four mols of the reaction product to one mol of silicon tetrachloride, there results a fluid copolymer of the formula

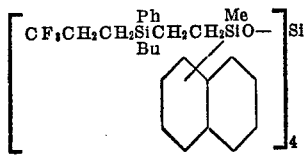

Example 8

When butyl β,γ,γ-trifluoro-β-chlorocyclobutylphenyl-vinylsilane and dimethylmonochlorosilane are reacted in accordance with the method of Example 1 in a molar ratio of 1:1 and the reaction product is hydrolyzed and condensed with benzyltrichlorosilane in a molar ratio of three mols of the reaction product to one mol of the trichlorosilane, a fluid copolymer results which consists of

and

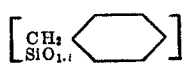

units.

Example 9

When an equimolar mixture of trifluorotolyldimethylvinylsilane, β,γ,γ - trifluoro - β - chlorocyclobutyldiphenylvinylsilane, phenylbutylmonochlorosilane, and 2-ethyl-hexylxenylmonochlorosilane is reacted in accordance with the method of Example 1 and the reaction product is hydrolyzed and condensed with an equimolar mixture of cyclohexyltrichlorosilane, phenyl-2-ethyl-6-bromo-hexyl-amylchlorosilane, tolylbenzyldichlorosilane and silicon tetrachloride, a copolymer results which consists of 12.5 mol percent of each of the following units:

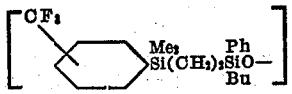

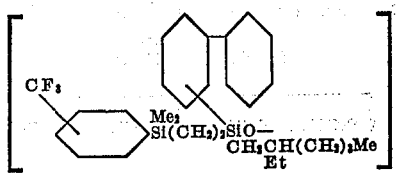

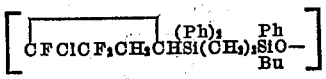

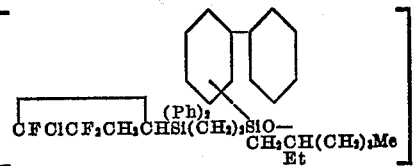

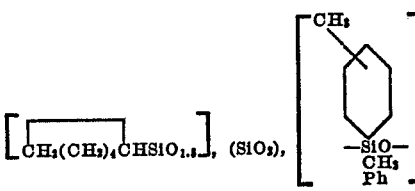

and

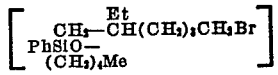

That which is claimed is:

1. A compound of the formula

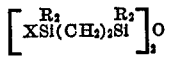

where R is selected from the group consisting of aryl, alkyl, and cycloalkyl hydrocarbon radicals and X is selected from the group consisting of CF₃CH₂CH₂—,

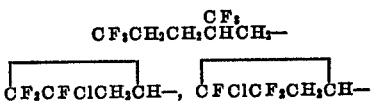

and

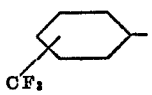

2. A compound of the formula

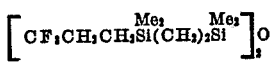

3. A compound of the formula

4. A compound of the formula

where one Y is fluorine and the other Y is chlorine.

5. A compound of the formula

6. A copolymer comprising from 0.1 to 80 mol percent of (1) siloxane units of the formula $$\left[\underset{XSi(CH_2)_2SiO_{.5}}{R_2 \quad R_2}\right]$$

where R is selected from the group consisting of aryl, alkyl, and cycloalkyl hydrocarbon radicals and where X is selected from the group consisting of $CF_3CH_2CH_2-$, $$CF_3CH_2CH_2\overset{CF_3}{\underset{|}{C}H}CH_2-$$

and

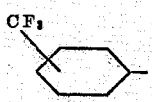

and from 99.9 to 20 mol percent of (2) siloxane units of the formula $$Z_mSiO_{\frac{4-m}{2}}$$

where Z is selected from the group consisting of monovalent hydrocarbon radicals and their halogenated derivatives, $m$ has an average value from 0 to 3 inclusive, in which copolymer the total number of Z groups and (1) siloxane units per silicon atom in (2) is at least 1.

References Cited in the file of this patent
UNITED STATES PATENTS
2,511,056   Goodwin _____ June 13, 1950
FOREIGN PATENTS
1,116,316   France _____ Jan. 30, 1956